A. SEAMAN.
Corn Planter.
No. 28,106.
Patented May 1, 1860.
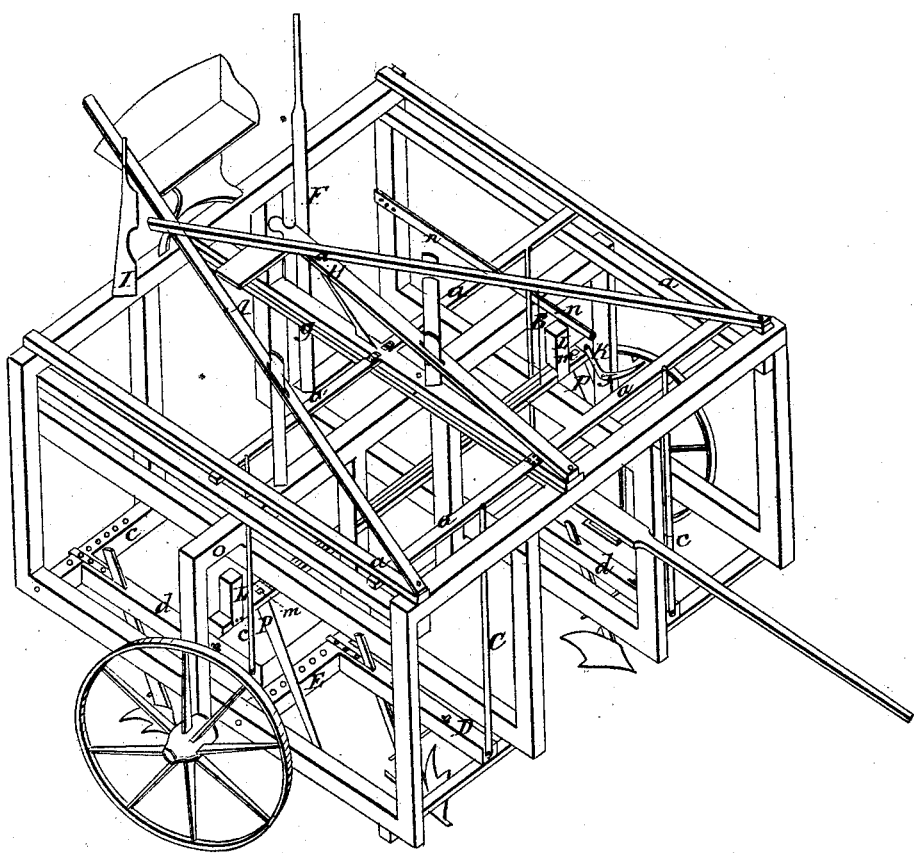
Witnesses
Elisha A Bigelow
E. A. Bowles.
Inventor.
Amos Seaman

UNITED STATES PATENT OFFICE.

AMOS SEAMAN, OF WINNEBAGO COUNTY, ILLINOIS.

IMPROVEMENT IN CORN-PLANTERS.

Specification forming part of Letters Patent No. 28,106, dated May 1, 1860.

*To all whom it may concern:*

Be it known that I, AMOS SEAMAN, of the county of Winnebago and State of Illinois, have invented a new and useful Machine for Cultivating and Planting Corn; and I do hereby declare that the following is a full, clear, and exact description of the construction and operation of the same, reference being had to the annexed drawings, making a part of this specification, in which the figure is a perspective view.

A *a a a a a a* is a combined hinged lever for the purpose of raising the plows out of the ground and throwing the machine out of gear by means of connecting-rod B. C *c c c* are iron straps connecting the plow-beams with the levers above described. D *d d d* are the plow-beams.

E *e e e* are axles, to which the plows are attached by an iron stirrup made to shift to any desired point for the purpose of turning the furrows to or from the corn-rows.

F is a hand-lever attached to the pole at *g* and hinged with hook-and-eye hinge; H, a foot-lever, which draws a bolt at the fore end of the lever, setting the pole at liberty to be shifted by hand-lever F for the purpose of guiding the machine when it becomes necessary to turn the team; I, a post notched so as to hold the combined lever at the desired position; J, a crank-lever attached to rotary post K, operated by protuberant knuckles on the wheel, as shown on the drawing, and spaced so as to drop the corn at proper distances; L L, the seed-boxes; M M, the seed-pockets, which are operated by the crank-lever J, to which they are attached, and thrown back by spring *n*, beneath the seed-boxes, to fill with seed; O, a crooked axle-tree to admit of the cultivation of corn, when at the height of four feet, by removing the planting apparatus; P P, the conductors which conduct the grain to the furrows.

What I claim as my invention, and desire to secure by Letters Patent, is—

The arrangement of the lever A, connecting-rod B, iron straps C, plow-beams D, axles E, hand-lever F, foot-lever H, post I, crank-lever J, and axles O, operating as described, for the purposes set forth.

AMOS SEAMAN.

In presence of—
JOHN D. PAKKS,
JAMES SEAMAN.